(12) United States Patent
Horn (10) Patent No.: US 10,501,199 B2
(45) Date of Patent: Dec. 10, 2019

(54) DUAL FUEL AIRCRAFT

(71) Applicant: Stuart H. Horn, Afton, WY (US)

(72) Inventor: Stuart H. Horn, Afton, WY (US)

( * ) Notice: Subject to any disclaimer, the term of this patent is extended or adjusted under 35 U.S.C. 154(b) by 892 days.

(21) Appl. No.: 14/304,428

(22) Filed: Jun. 13, 2014

(65) Prior Publication Data

US 2015/0360793 A1 Dec. 17, 2015

(51) Int. Cl.
  *B64D 37/30* (2006.01)
  *B64D 37/28* (2006.01)
  *B64D 37/04* (2006.01)
  *F02M 43/00* (2006.01)

(52) U.S. Cl.
  CPC ............ *B64D 37/28* (2013.01); *B64D 37/04* (2013.01); *F02M 43/00* (2013.01)

(58) Field of Classification Search
  CPC .. B64D 27/04; B64D 2027/026; B64D 31/00; B64D 31/06; B64D 37/04; B64D 37/06; B64D 37/30
  USPC ...................................................... 244/118.2
  See application file for complete search history.

(56) References Cited

U.S. PATENT DOCUMENTS

| | | | | |
|---|---|---|---|---|
| 2,069,996 A | * | 2/1937 | Carleton | B64D 37/12 244/135 R |
| 2,991,055 A | | 7/1961 | Powell et al. | |
| 3,114,359 A | | 12/1963 | Haase | |
| 3,991,561 A | * | 11/1976 | Leto | F02C 7/222 137/606 |
| 5,092,305 A | * | 3/1992 | King | F02D 19/0631 123/1 A |
| 5,469,830 A | * | 11/1995 | Gonzalez | F02D 19/0628 123/515 |
| 5,483,943 A | * | 1/1996 | Peters | F02M 21/0239 123/527 |
| 5,544,633 A | * | 8/1996 | Mottier | F02P 1/08 123/310 |
| 5,555,873 A | * | 9/1996 | Nolen | F02M 37/0064 123/575 |

(Continued)

OTHER PUBLICATIONS

Loth et al, Fuel Injection & Carburetion for Dual Fuel Capabilityof IC Engines, Jul. 1997, AIAA.*

(Continued)

*Primary Examiner* — Tien Q Dinh
*Assistant Examiner* — Vincente Rodriguez
(74) *Attorney, Agent, or Firm* — Law Offices of Michael L. Wise, LLC (57) ABSTRACT

An aircraft comprises several elements. A throttle body is adapted to regulate a rate of air flow. An electronic control unit, in turn, is in signal communication with one or more sensors, and comprises a data processor in signal communication with a memory. A first fuel delivery system is operative to direct a first fuel from a first fuel tank to the plurality of cylinders at a rate determined at least in part by a condition of the throttle body. A second fuel delivery system is operative to direct a second fuel from a second fuel tank to the plurality of cylinders at a rate determined at least in part by the electronic control unit in response to signals from the one or more sensors. One or more fuel selection controls allow a pilot of the aircraft to select between powering the aircraft with the first fuel delivery system and the second fuel delivery system.

16 Claims, 7 Drawing Sheets

(56) References Cited

U.S. PATENT DOCUMENTS

| | | | |
|---|---|---|---|
| 6,145,494 | A | 11/2000 | Klopp |
| 6,289,881 | B1 | 9/2001 | Klopp |
| 6,591,817 | B2 | 7/2003 | Deutsch |
| 8,463,528 | B2 | 6/2013 | Cologna |
| 2006/0101823 | A1 | 5/2006 | Takemoto et al. |
| 2011/0097228 | A1* | 4/2011 | Tokuo ................ F02M 37/0047 417/505 |
| 2012/0266846 | A1* | 10/2012 | Kilbourne ............. F02M 43/00 123/478 |

OTHER PUBLICATIONS

EFII, "EFII Installation Instructions and User Guide: Rev. 1.2," Sep. 2013, pp. 1-26, Upland, CA.
Precision Airmotive Corporation, "Training Manual: RSA Fuel Injection System," Jan. 1, 1990, pp. 1-28, Everett, WA.

* cited by examiner

DUAL FUEL AIRCRAFT

FIELD OF THE INVENTION

The present invention relates generally to aircraft, and, more particularly, to fuel systems for aircraft.

BACKGROUND OF THE INVENTION

General aviation in the United States is often considered an industry in decline. The number of active pilots has shown a steady decrease for several decades. In the year 1980, for example, there were about 360,000 active private pilots, while, in 2009, there were only about 220,000 active pilots remaining. This rapid decline has been attributed to many causes. One likely cause is the ever-increasing expense of flying and flight training Much of this expense can be attributed to the high costs of aviation gasoline. Most general aviation piston aircraft require 100-octane gasoline. Presently, 100-octane aviation gasoline sells for several dollars more than the gasoline used in automobiles. A common piston aircraft for flight training, the Cessna 172, typically burns over nine gallons of gasoline per hour.

At the same time, general aviation has been targeted as an unwanted source of pollution. Aviation gasoline with 100 octane contains significant amounts of lead. In fact, aviation gasoline is one of the few fuels in the United States that still contain lead, leaving it as the single largest source of lead emissions in the country. There is, as a result, ongoing efforts to legislate leaded aviation gasoline out of existence. Alternative, unleaded gasolines that can be used as a drop-in replacement for leaded aviation gasoline are under development, but are very slow to gain governmental approval and any kind of significant distribution.

SUMMARY OF THE INVENTION

Embodiments of the present invention address the above-identified needs by providing aircraft designed to operate on two different fuels, and being switchable therebetween while in flight.

Aspects of the invention are directed to an aircraft comprising a plurality of cylinders, a throttle body, one or more sensors, an electronic control unit, a first fuel tank, a second fuel tank, a first fuel delivery system, a second fuel delivery system, and one or more fuel selection controls. The throttle body is adapted to regulate a rate of air flow. The electronic control unit, in turn, is in signal communication with the one or more sensors, and comprises a data processor in signal communication with a memory. The first fuel tank is operative to store a first fuel, while the second fuel tank is operative to store a second fuel. The first fuel delivery system is operative to direct the first fuel from the first fuel tank to the plurality of cylinders at a rate determined at least in part by a condition of the throttle body. The second fuel delivery system, in contrast, is operative to direct a second fuel from the second fuel tank to the plurality of cylinders at a rate determined at least in part by the electronic control unit in response to signals from the one or more sensors. The one or more fuel selection controls allow a pilot of the aircraft to select between powering the aircraft with the first fuel delivery system and the second fuel delivery system. The first fuel delivery system is operative without receiving electrical power.

In one or more of the above-identified embodiments of the invention, for example, the first fuel comprises gasoline while the second fuel comprises compressed natural gas (CNG). Use of CNG instead of gasoline increases aircraft performance, reduces fuel and maintenance costs, and also decreases harmful emissions. In case of a loss of electrical power, the aircraft resorts to running on gasoline.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Moreover, while an aircraft has a myriad of components and systems, only those elements important to setting forth aspects of the invention are described with any particularity herein. Nevertheless, one having ordinary skill in the relevant arts will recognize the additional elements needed to make a viable aircraft. Reference is also made to the following references, which are published by the Federal Aviation Administration of the U.S. Department of Transportation:

Pilot's Handbook of Aeronautical Knowledge (2008);
Aviation Maintenance Technician Handbook (2008);
Aviation Maintenance Technician Handbook—Airframe, Volumes 1 and 2 (2012); and
Aviation Maintenance Technician Handbook—Powerplant, Volumes 1 and 2 (2012).

These references are hereby incorporated by reference herein. Reference is further made to I. Moir et al., *Aircraft Systems: Mechanical, Electrical, and Avionics Subsystems Integration, Third Edition,* Wiley (2008), which is also hereby incorporated by reference herein.

Figure 1:
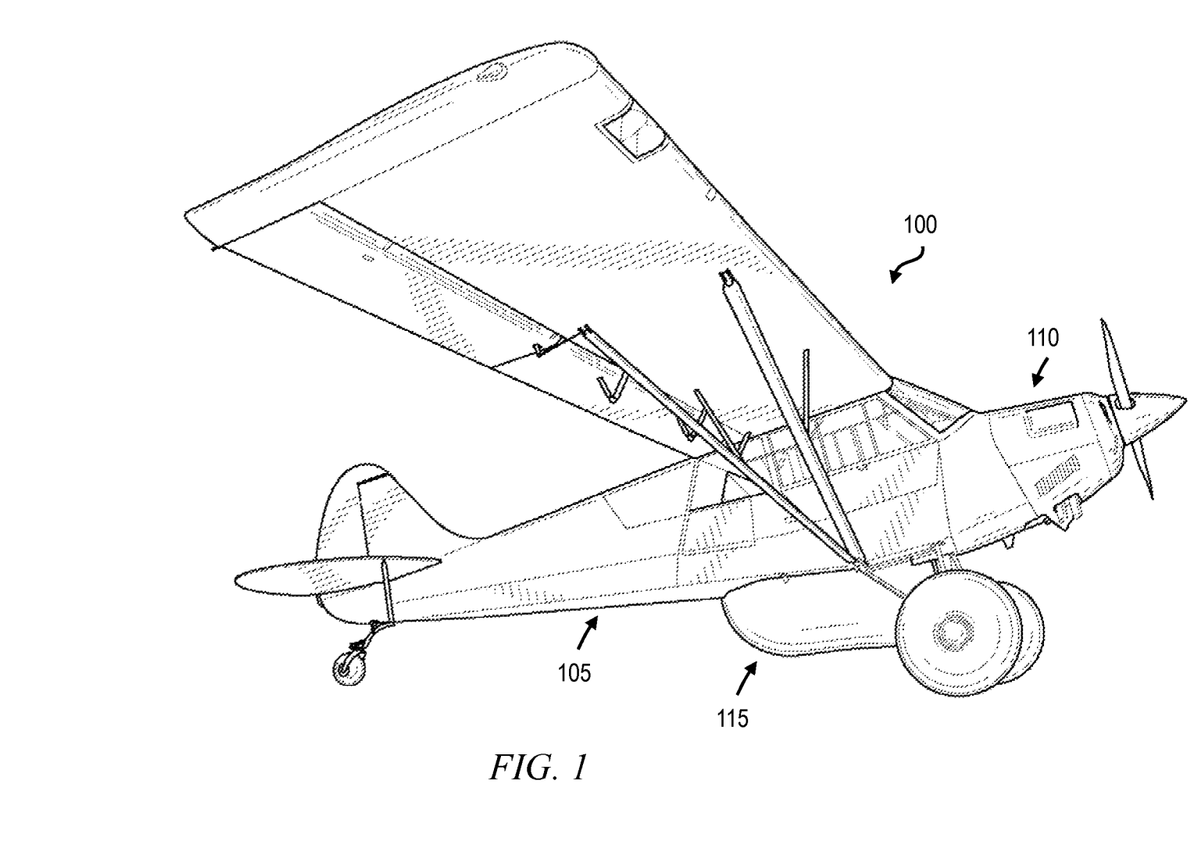
FIG. 1 shows a perspective view of an aircraft in accordance with an illustrative embodiment of the invention.

FIG. 1 shows a perspective view of an aircraft 100 in accordance with an illustrative embodiment of the invention. The exemplary aircraft 100 comprises an airframe 105, to which is attached an internal combustion engine 110. An external fuel tank 115 is attached to a belly of the aircraft 100.

Figure 2:
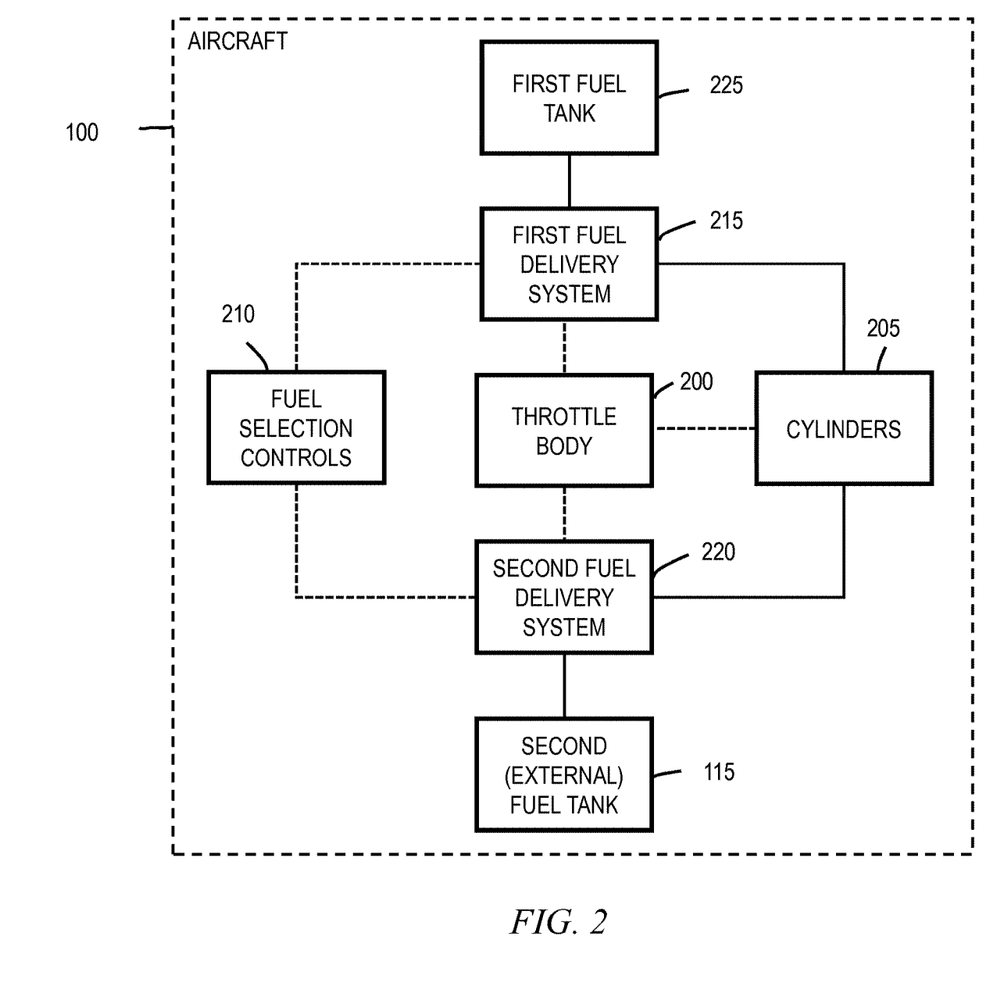
FIG. 2 shows a block diagram of some engine- and fuel-related elements in the FIG. 1 aircraft.

The aircraft 100 has the unique capability to be powered by two different fuels. FIG. 2 shows a block diagram of some elements of the aircraft 100 that help to provide this functionality. A throttle body 200 regulates a rate of air flow to an intake manifold and ultimately to a plurality of cylinders 205 of the engine 110. At the same time, fuel selection controls 210 allow a pilot of the aircraft 100 to select between powering the aircraft 100 using a first fuel delivery system 215 and a second fuel delivery system 220. When the first fuel delivery system 215 is selected, the first fuel delivery system 215 delivers a first fuel from a first fuel tank 225 to the cylinders 205. Similarly, when the second fuel delivery system 220 is selected, it delivers a second fuel from the second fuel tank 115 to the cylinders 205. In the present illustrative embodiment, the second fuel tank 115 is simply the external fuel tank 115, visible in FIG. 1.

Figure 3:
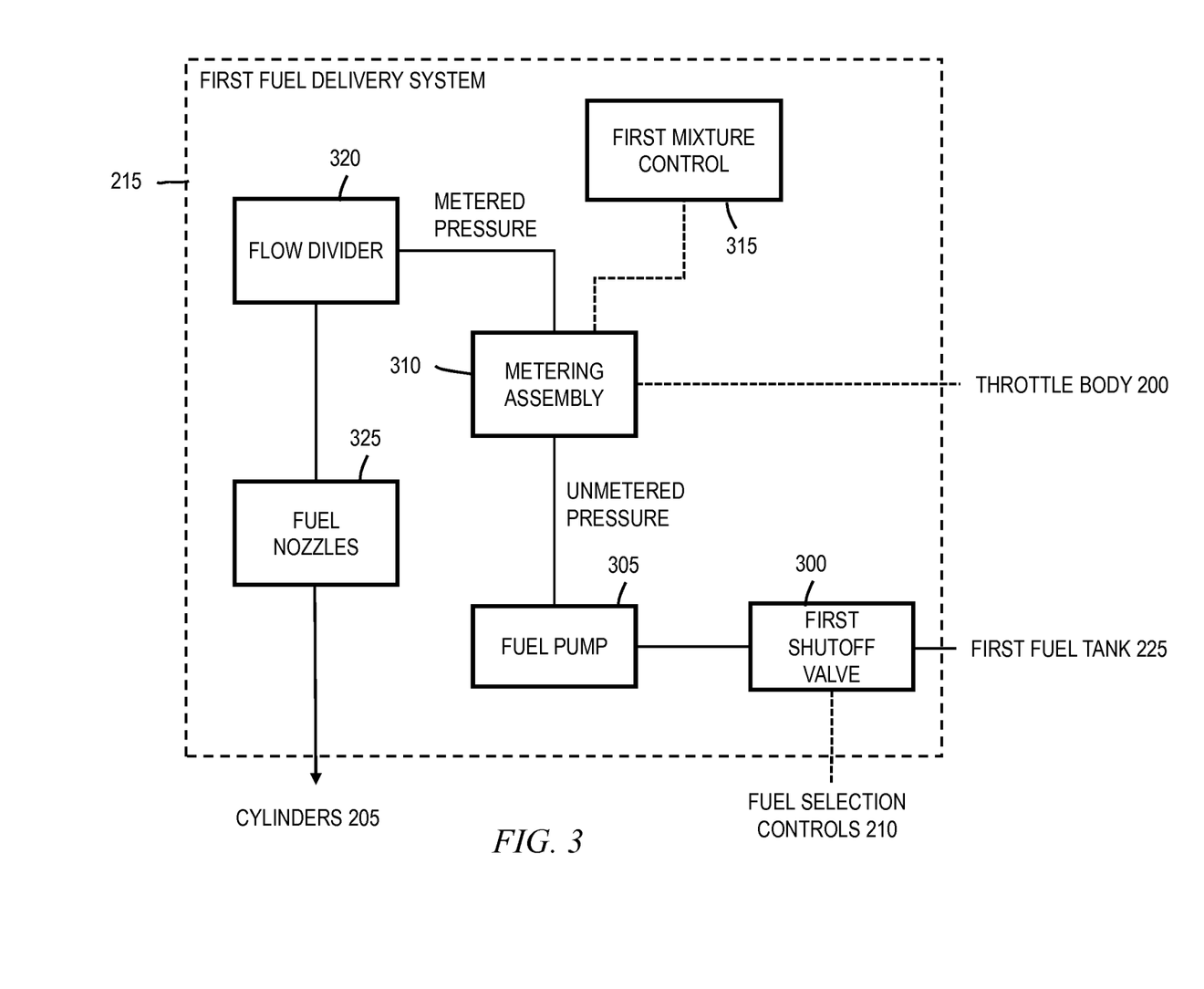
FIG. 3 shows a block diagram of an illustrative first fuel delivery system in the FIG. 1 aircraft.

FIG. 3 shows a block diagram of the first fuel delivery system 215 in the aircraft 100. For purposes of illustration, the first fuel is assumed to consist of conventional aviation gasoline. The first fuel delivery system 215 comprises: a first shutoff valve 300, a fuel pump 305, a metering assembly 310, a first mixture control 315, a flow divider 320, and fuel nozzles 325.

In the present illustrative embodiment, the first shutoff valve 300 is preferably electrically actuated and defaults to its open state when electrical power is lost or removed. The first shutoff valve 300 is therefore normally-open. In the open state, gasoline is allowed to pass from the first fuel tank 225 to the fuel pump 305. In contrast, with the first shutoff valve 300 in its closed state, the flow of gasoline to the fuel pump 305 is blocked. A suitable, normally-open first shutoff valve 300 may be obtained from, for example, Sizto Tech Corp. (Palo Alto, Calif., USA). Such a valve utilizes a solenoid for its actuation.

The first shutoff valve 300 is controlled by a fuel selector switch, which is part of the fuel selection controls 210. The fuel selector switch may comprise a simple two-position toggle switch that is available to the pilot in the cockpit. One position of the toggle switch may activate the first fuel delivery system 215, while the other position activates the second fuel delivery system 220. With the first fuel delivery system 215 selected, the first shutoff valve 300 is de-energized so that it takes on its open state. With the second fuel delivery system 220 selected, electrical power actuates the first shutoff valve 300 and causes the first shutoff valve 300 to take on its closed state.

The remainder of the first fuel delivery system 215 forms a mechanical, continuous-flow fuel injection system similar to the "Bendix RSA-type" found in many conventional fuel-injected aviation engines. The fuel pump 305, the metering assembly 310, the flow divider 320, the fuel nozzles 325, and the various plumbing that interconnects these elements are therefore conventional and may be sourced from, for example, Lycoming Engines, a division of Avco Corp. (Williamsport, Pa., USA). A detailed description of Bendix RSA-type fuel delivery systems can be found in U.S. Pat. No. 3,114,359 to E. A. Haase and entitled "Fuel Supply System," which is hereby incorporated by reference herein. Reference is also made to Precision Airmotive Corporation, *Training Manual: RSA Fuel Injection System*, Jan. 1, 1990, which is also hereby incorporated by reference herein.

Briefly, the fuel pump 305 is an engine-driven, positive displacement rotary-vane pump that acts to deliver fuel at a relatively high, constant pressure to the metering assembly 310. The metering assembly 310, in turn, meters out the fuel to the flow divider 320 at a pressure proportional to the amount of air being transmitted through the throttle body 200 at that particular time. In the present illustrative embodiment, this is accomplished by mechanically sensing an impact air pressure and a venturi suction air pressure (i.e., a reduced air pressure proportional to air flow at a venturi) in the throttle body 200. Opening or closing the throttle valve (i.e., butterfly valve) in the throttle body 200 results in a change in the volume of air being drawn into the engine 110. When air volume increases, the impact pressure in the throttle body 200 remains relatively constant and the venturi suction air pressure decreases. This decrease creates a differential pressure in the metering assembly 310 that moves two diaphragms in such a way as to allow more fuel to flow to the flow divider 320. When the throttle is decreased and air volume decreases through the throttle body 200, the same dynamics cause less fuel to flow from the metering assembly 310 to the flow divider 320. The rate of fuel flow from the metering assembly 310 to the flow divider 320 is thereby determined at least in part based on the volume of air flow in the throttle body 200. The metering assembly 310 is also mechanically attached to the first mixture control 315 (by, e.g., a cable). The first mixture control 315 allows the pilot to manually adjust the fuel-air mixture as desired.

Once the metered fuel is delivered from the metering assembly 310 to the flow divider 320, the flow divider 320 evenly divides the fuel to the fuel nozzles 325. In the present illustrative embodiment, there is one fuel nozzle 325 for each cylinder 205. Each of the fuel nozzles 325 is of the air bleed configuration, and directs its output continuously onto a respective intake port for its respective cylinder 205. Before entering the individual intake valve chambers, the fuel mixes with air. The cylinders 205 then consume the air-fuel mixture to produce power in the manner of a conventional four-stroke engine.

Figure 4:
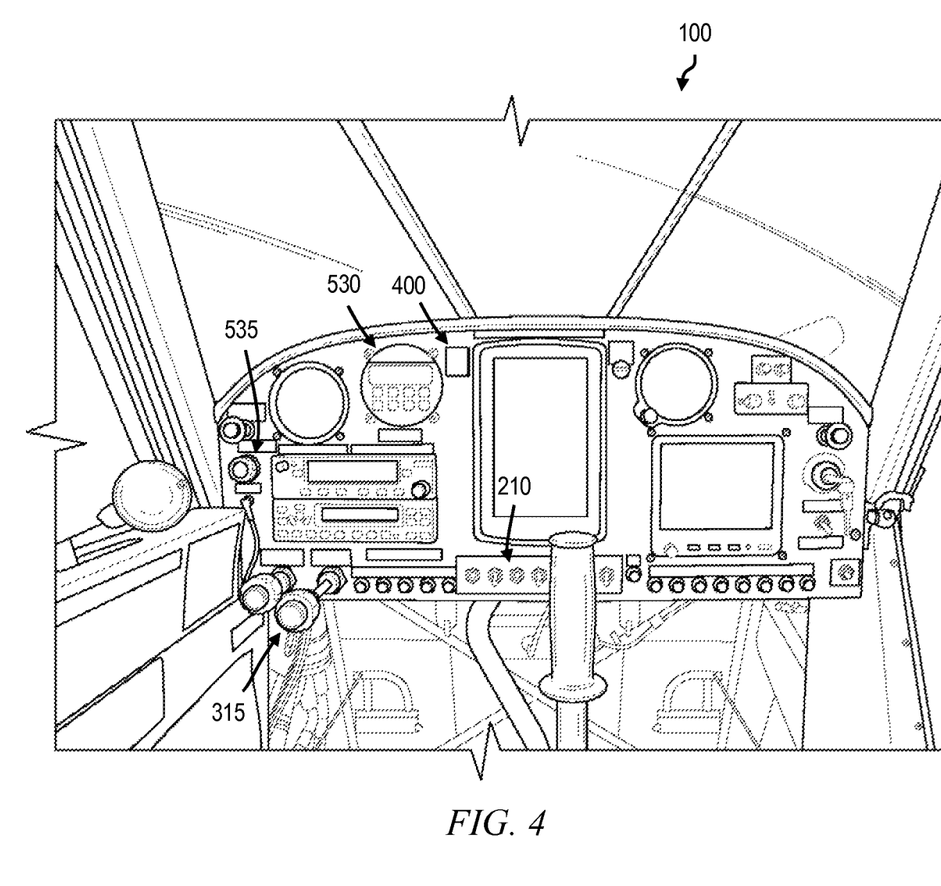
FIG. 4 shows an elevational view of an illustrative cockpit layout in the FIG. 1 aircraft.

FIG. 4 shows an elevational view of an illustrative cockpit layout in the aircraft 100. The fuel selection controls 210 and the first mixture control 315 are labeled.

Figure 5:
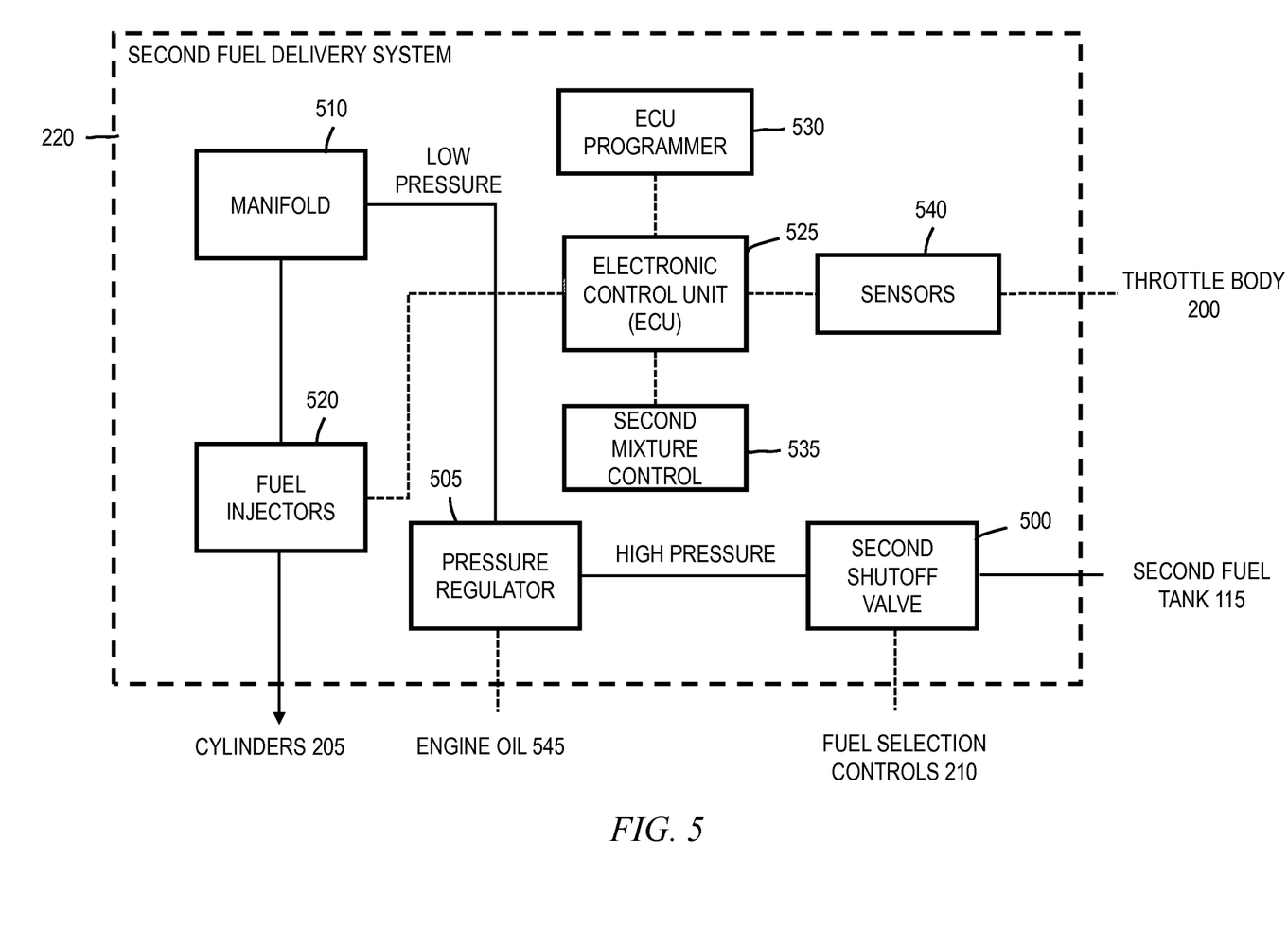
FIG. 5 shows a block diagram of an illustrative second fuel delivery system in the FIG. 1 aircraft.

The second fuel delivery system 220 is very different from the first fuel delivery system 215 in that the second fuel delivery system 220 largely depends on computer control. For purposes of example, the second fuel is assumed to comprise CNG. The CNG comprises natural gas compressed to a pressure of about 3,600 psi. Accordingly, the second fuel tank 115 comprises a tank capable of storing such a pressurized gas.

Aspects of the second fuel delivery system 220 are shown in the block diagram in FIG. 5. The second fuel delivery system 220 comprises: a second shutoff valve 500, a pressure regulator 505, a manifold 510, fuel injectors 520, an electronic control unit (ECU) 525, an ECU programmer 530, a second mixture control 535, and sensors 540. Electrical power (not specifically shown) is supplied to the ECU 525. The ECU 525 distributes the electrical power to the other elements as required.

Like the first shutoff valve 300, the second shutoff valve 500 is preferably electrically actuated. In the second fuel delivery system 220, however, the second shutoff valve 500 is preferably configured in a normally-closed configuration, meaning that it takes on a closed state when electrical power is lost or removed. The second shutoff valve 500 can be controlled by the fuel selection switch within the fuel selection controls 210 in the cockpit (described above). With the second fuel delivery system 220 selected, the second shutoff valve 300 is electrically activated and takes on its open state. With the first fuel delivery system 215 selected, electrical power to the second shutoff valve 500 is removed, and the second shutoff valve 500 is allowed to take on its closed state.

In its open state, the second shutoff valve 500 allows CNG to flow from the second fuel tank 115 to the pressure regulator 505, while, in its closed state, the flow is interrupted. The pressure regulator 505 acts to reduce the pressure of the CNG from the pressure in the second fuel tank 115 (e.g., as high as 3,600 psi) down to a pressure that is appropriate for the manifold 510 and the fuel injectors 520. The output of the pressure regulator 505 may, for example, have a regulated pressure of about 15-36 psi, although, like all specific values presented herein, these values are merely illustrative and are non-limiting.

Due to the substantial pressure drop at the pressure regulator 505, expansion cooling may occur. If not addressed, moisture in the pressure regulator 505 may freeze and cause a blockage. To avoid this potential issue in the aircraft 100, hot engine oil 545 is circulated through a portion of the pressure regulator 505 as part of the engine oil's normal circulation through the engine 110. The provisioning of engine oil 545 to the pressure regulator 505 is also indicated schematically in FIG. 5.

The pressure-regulated CNG leaving the pressure regulator 505 travels to the manifold 510, where it is distributed to the fuel injectors 520. The manifold 510 may comprise fuel rails connected to the fuel injectors 520. There is one fuel injector 520 for each cylinder 205. In the present illustrative embodiment, each fuel injector 520 is mounted just above the intake valve of its respective cylinder 205. Each fuel injector 520 comprises a respective solenoid valve controlled by the ECU 525. The ECU 525 causes the fuel injectors 520 to pulsedly direct fuel to the cylinders 205 (i.e., the flow is not continuous, but is pulsed). The duration of the pulses ultimately determines the amount of CNG that flows to the cylinders 205 and thereby the fuel-air mixture.

The ECU 525 comprises data processing circuitry in signal communication with memory circuitry. The data processing circuitry of the ECU 525 determines the pulse characteristics of the fuel injectors 520 and, correspondingly, the fuel-air mixture at the cylinders 205. The ECU determines the pulse characteristics at least in part based on inputs from the sensors 540. These determinations may be performed algorithmically, by resort to a look-up table stored in the memory circuitry (e.g., a "fuel map"), or by some combination of these methods. In the present non-limiting embodiment, the fuel injectors 520 are batch fired, meaning that they are signaled to open at the same time. In alternative embodiments, however, the fuel injectors 520 may be configured to be individually controlled so as to create a sequential fuel injection system.

Figure 6:
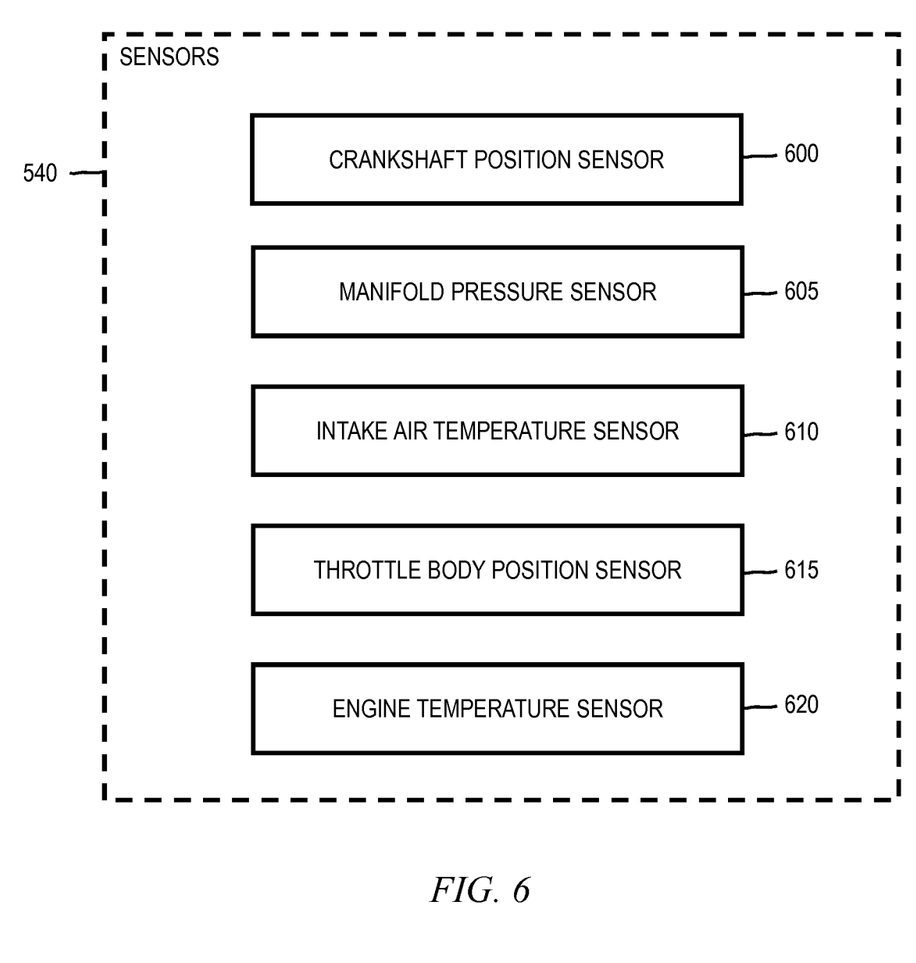
FIG. 6 shows a block diagram of illustrative sensors in the FIG. 1 aircraft.

FIG. 6 shows a block diagram of at least some of the sensors 540 within the illustrative aircraft 100. A crankshaft position sensor 600 provides the ECU 525 with engine timing and crankshaft revolutions-per-minute (RPM) data. In the present illustrative embodiment, the crankshaft position sensor 600 comprises a Hall Effect sensor mounted externally on the engine 110 so as to be able to detect magnets fixed to a flywheel. The flywheel, in turn, is attached to the crankshaft and rotates in unison therewith. A manifold pressure sensor 605, in turn, is plumbed into the intake manifold of the engine 110 and sends the ECU 525 the instantaneous absolute manifold pressure. An intake air temperature sensor 610 is mounted on the side of the throttle body 200 and measures the temperature of the intake air. With values for RPM, manifold pressure, and intake air temperature, the ECU 525 can apply a speed-density calculation to estimate the air mass flow through the engine 110. Such a calculation will be familiar to one having ordinary skill in the relevant arts. Reference is also made to G. Bannish, *Designing and Tuning High-Performance Fuel Injection Systems*, CarTech (2009), which is hereby incorporated by reference herein. Once calculated, this value may be utilized to determine the fuel metering required for optimum combustion.

Additional sensor data is provided to the ECU 525 by a throttle body position sensor 615. The throttle body position sensor 615 is mounted to the butterfly shaft of the throttle body and indicates to the ECU 525 position information concerning the throttle valve. If the ECU 525 detects a rapid opening of the throttle, it may direct some additional fuel to the cylinders 205 to keep the engine 110 from stumbling during the ensuing engine acceleration. Lastly, an engine temperature sensor 620 attached to the engine 110 lets the ECU 525 know if the engine 110 is cold or if it has warmed to normal operating temperature. While the engine 110 is cold, the ECU 525 may be programmed to enrichen the mixture somewhat to help the cold engine 110 run more smoothly.

In the present illustrative embodiment, the ECU programmer 530 and the second mixture control 535 are made available to the pilot in the cockpit, and are visible in FIG. 4. A fuel gauge 400 for the second fuel (e.g., CNG) is further provided. The ECU programmer 530 and the second mixture control 535 allow the pilot to modify the fuel-air mixture determined by the ECU 525. The ECU programmer 530 also allows the pilot to see the values coming from the various sensors 540. In the present illustrative embodiment, the ECU programmer 530 comprises a LCD display and a keypad, and is powered through a serial connection to the ECU 525. The second mixture control 535 is a knob-like potentiometer in signal communication with the ECU programmer 530.

Although the configuration of the aircraft 100 is entirely novel, most of the elements of the second fuel delivery system 220 can be sourced commercially. A suitable combination solenoid-type shutoff valve (normally-closed) and pressure regulator can be sourced from, for example, Tomasetto Achille Spa (Castegnero, Italy). The remainder of the elements forming the second fuel delivery system 220 (e.g., the manifold 510, the fuel injectors 520, the ECU 525, the ECU programmer 530, the second mixture control 535, and the sensors 540) may be variously obtained from, for instance, EFII (Upland, Calif., USA) and Racetech Inc. (Calgary, Alberta, Canada).

With the aircraft 100 configured as described above, operating the aircraft 100 on the two different fuels becomes relatively straightforward. To operate on liquid gasoline, for example, the first fuel delivery system 215 is selected utilizing the fuel selector switch of the fuel selection controls 210. The first mixture control 315 is also set as required to maintain the engine 110 at a suitable air-fuel mixture. In contrast, to operate on CNG, the fuel selector switch is toggled to select the second fuel delivery system 220. With CNG, the ECU programmer 530 and the second mixture control 535 allow the pilot to adjust air-fuel mixture from the cockpit, if desired.

Notably, configured as above, the aircraft 100 will continue to operate in case of loss of electrical power. The first fuel delivery system 215 is capable of operating without receiving electrical power. The first shutoff valve 300, although electric, is normally-open and therefore opens when electrical power is lost or removed. The remaining elements of the first fuel delivery system 215 are entirely mechanical. Thus, if electrical power is lost in the aircraft 100, the first fuel delivery system 215 is capable of delivering gasoline from the first fuel tank 225 to the cylinders 205.

At the same time, if electrical power is lost while operating on CNG, the normally-closed second shutoff valve 500 will automatically close while the normally-open first shutoff valve 300 automatically opens. The engine 110 will, thereafter, be able to operate normally utilizing liquid gasoline and the first fuel delivery system 215. Thus, the unique combination of separate mechanical and electronic fuel injection systems for the two different fuels gives the aircraft 100 significant safety advantages, particularly in the case of electrical issues. Electrical issues in general aviation aircraft from, for example, alternator failures, are quite common.

To add convenience to the provisioning of CNG to the aircraft 100, the second fuel tank 115 (i.e., the external fuel tank 115) may be made to be easily attached and removed from the aircraft 100. This allows the user to transport the second fuel tank 115 to an off-airport CNG refilling station.

Figure 7:
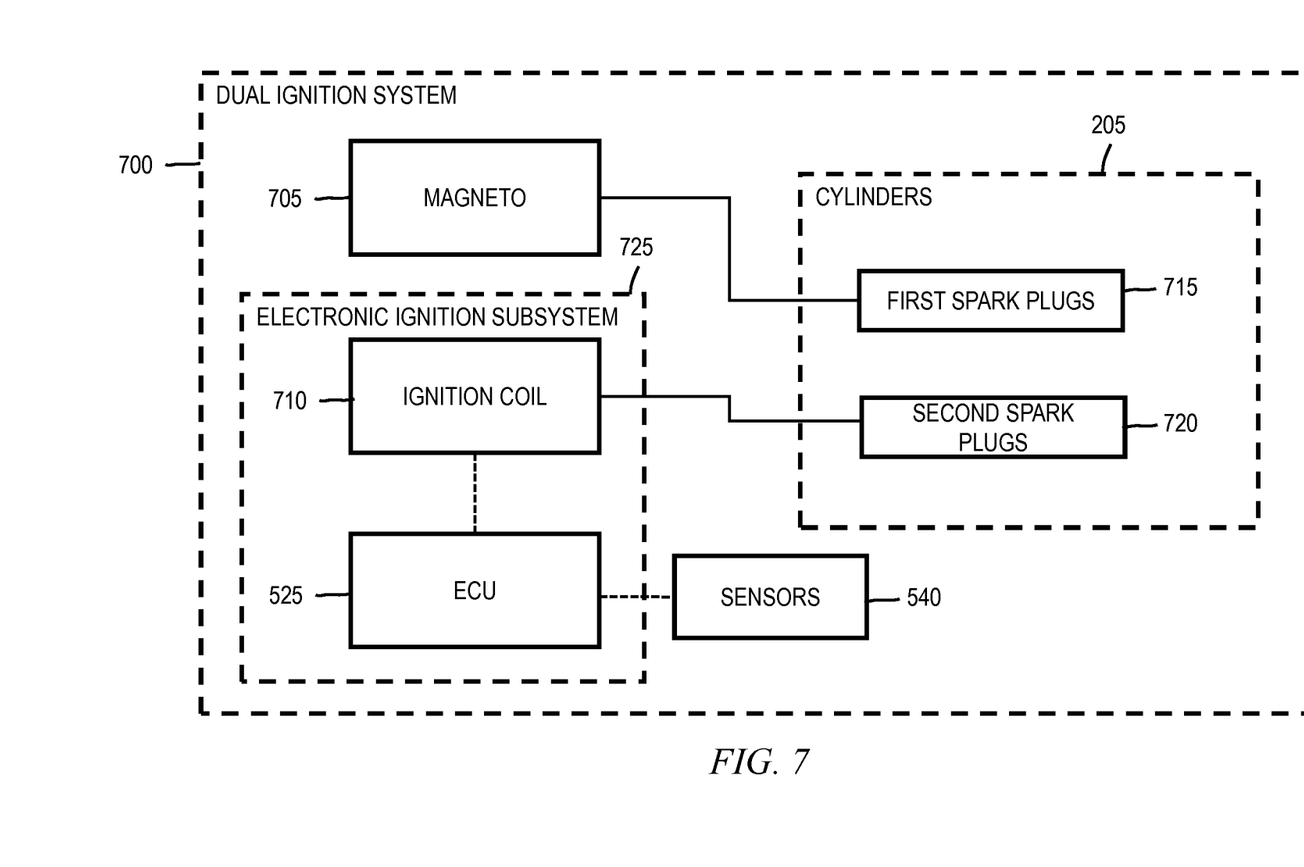
FIG. 7 shows a block diagram of an optional ignition system in the FIG. 1 aircraft.

Additionally, as another option, the aircraft 100 may incorporate a dual ignition system. FIG. 7 shows an optional dual ignition system 700 for the aircraft 100, in accordance with an illustrative embodiment of the invention. The dual ignition system 700 comprises a magneto 705, the ECU 525, the sensors 540, an ignition coil 710, first spark plugs 715, and second spark plugs 720. The ignition coil 710 is in signal communication with the ECU 525, and the two elements combine to form an electronic ignition subsystem 725. Each cylinder 205 includes two respective spark plugs: a respective first spark plug 715 and a respective second spark plug 720.

The magneto 705 is mechanically engine-driven and drives the first spark plugs 715 in each of the cylinders 205. Magnetos are commonly found in general aviation aircraft, and may be obtained from vendors such as Lycoming Engines and Continental Motors. The ECU 525, in contrast, uses data from the sensors 540 to determine when the second spark plugs 720 fire based on an ignition timing algorithm or an ignition timing curve programmed in memory. In so doing, the electronic ignition subsystem 725 will typically provide better fuel efficiency and better engine performance than the magneto 705. The ECU 525 and the ignition coil 710 may be obtained commercially from EFII. The ignition timing determined by the ECU 525 may also be modified by the pilot utilizing the ECU programmer 530, if desired.

The dual ignition system 700 has the advantage of allowing the benefits of an electronic ignition system while also being functional in case the aircraft 100 loses electrical power. If electrical power is lost, the magneto 705 will continue to fire the first spark plugs 715, allowing the engine 110 to continue to operate. Thus, both fuel delivery systems 215, 220 and the optional dual ignition system 700 assure that, should an electrical issue occur on the aircraft 100, the aircraft's engine 110 will continue to operate.

The use of CNG in place of aviation gasoline in general aviation piston aircraft provides several advantages. A gasoline-gallon-equivalent (GGE; i.e., the amount of CNG required to equal the energy content of one gallon of gasoline) is presently about 80% less expensive than a gallon of gasoline. At the same time, natural gas is a domestic product. Currently, about 90% of natural gas used in the United States is produced domestically.

CNG also has a higher octane rating than gasoline (138 octane versus 100 octane) and aircraft engine performance is thereby improved, particularly at higher altitudes where the air is less dense. Moreover, CNG is less contaminating to engine oil than aviation gasoline, allowing longer engine oil life and reduced maintenance. A GGE of CNG also weighs less than a gallon of aviation fuel. A GGE of CNG occupies about 127 cubic feet (at standard conditions) and weighs about 5.7 pounds. In comparison, a gallon of aviation gasoline weighs about 6.0 pounds.

A typical training flight in a general aviation aircraft is rather short, with some 86% of training flights lasting less than one hour. A typical training aircraft consumes about nine gallons of gasoline per hour. As a result, a dual fuel aircraft in accordance with aspects of the invention that is capable of carrying nine GGEs of CNG (a very reasonable amount) would be able to fly most or all of such a typical training flight solely on CNG. Fuel costs associated with training could therefore be reduced by the above-specified 80% difference in costs.

Just as significantly, CNG has several environmental benefits over aviation gasoline. CNG contains no lead. In addition, CNG burns cleaner than gasoline. Use of CNG is estimated to reduce smog pollutant emissions by about 90%, and to reduce carbon dioxide emissions by about 30%. Use of CNG also produces fewer greenhouse gases such as carbon monoxide, non-methane hydrocarbons, and nitrogen oxides (i.e., NOR). Also, spills while refueling CNG are highly unlikely, while spills while refueling gasoline are commonplace. In fact, evaporation or emission during gasoline refueling is estimated to account for about 50% of a gasoline vehicle's total hydrocarbon emissions.

A prototype aircraft having dual fuel delivery systems and a dual ignition system similar to those described above was developed by Aviat Aircraft, Inc. (Afton, Wyo., USA). The aircraft appeared much like the aircraft 100 in FIG. 1. The prototype aircraft was a modified Husky A-1C with a Lycoming IO-360-A1 D6 fuel-injected engine. Gasoline fuel capacity was 52 gallons. The aircraft was fitted with an external CNG belly tank capable of holding 9.2 GGEs of CNG. The belly tank weighed about 95 pounds empty, and was easily removed from, and reattached to, the remainder of the aircraft to aid in off-airport refueling. The prototype's stock pistons were replaced to increase compression from about 8.5:1 to about 10:1 to better utilize the higher octane CNG.

In extensive flight testing, the prototype aircraft exhibited many of the advantages set forth above. Switching between fuels in flight was routine and the engine never stopped running during the transition. At the same time, at a fuel burn of ten gallons per hour, for example, use of CNG was estimated to save about $40-60 per hour. It was also noted that the prototype aircraft benefited from colder exhaust-gas temperatures and cylinder-head temperatures when compared to gasoline. The prototype also did not exhibit any issues with vapor lock and "hot starts" when operating with CNG.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

For example, while the metering assembly 310 utilizes pressures within the throttle body 200 to meter fuel flow in proportion to air volume, other embodiments falling within the scope of the invention may utilize alternative arrangements. In one or more alternative embodiments, for example, the metering assembly 310 may comprise a rotary valve that is mechanically linked to the throttle valve within the throttle body 200. The position of the rotary valve controls the fuel passed to the flow divider 320. A change in the position of the throttle valve thereby causes a change in the amount of gasoline being discharged from the metering assembly 310. Aspects of such an alternative metering assembly 310 are described in U.S. Pat. No. 2,991,055 to R. J. Powell et al. and entitled "Fuel Injection System," which is hereby incorporated by reference herein. Such a system is utilized in many fuel-injected engines from Continental Motors, Inc. (Mobile, Ala., USA). Thus elements for such an alternative system can also be sourced commercially.

While gasoline and CNG fuels are discussed in detail above, alternative fuels may also be utilized. In one or more alternative embodiments, for example, the second fuel delivery system 220 may be configured to operate with alternative fuels such as, but not limited to, propane, liquefied natural gas (LNG), liquefied petroleum gas (LPG), or hydrogen.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An aircraft comprising:
   a plurality of cylinders;
   a throttle body, the throttle body adapted to regulate a rate of air flow;
   one or more sensors;
   an electronic control unit, the electronic control unit in signal communication with the one or more sensors, and comprising a data processor in signal communication with a memory;
   a first fuel tank, the first fuel tank operative to store a first fuel;
   a second fuel tank, the second fuel tank operative to store a second fuel;
   a first fuel delivery system, the first fuel delivery system operative to direct the first fuel from the first fuel tank to the plurality of cylinders at a rate determined at least in part by a condition of the throttle body;
   a second fuel delivery system, the second fuel delivery system operative to direct a second fuel from the second fuel tank to the plurality of cylinders at a rate determined at least in part by the electronic control unit in response to signals from the one or more sensors;
   one or more fuel selection controls, the one or more fuel selection controls allowing a pilot of the aircraft to select between powering the aircraft with the first fuel delivery system and the second fuel delivery system;
   a normally-open solenoid valve, the normally-open solenoid valve being controlled at least in part by the one or more fuel selection controls and being operative to control a flow of the first fuel; and
   a normally-closed solenoid valve, the normally-closed solenoid valve being controlled at least in part by the one or more fuel selection controls and being operative to control a flow of the second fuel;
   wherein the first fuel delivery system is operative without receiving electrical power.

2. The aircraft of claim 1, wherein the first fuel comprises gasoline.

3. The aircraft of claim 1, wherein:
   the aircraft further comprises a cockpit; and
   the second fuel system further comprises a mixture control, the mixture control available to the pilot in the cockpit, in signal communication with the electronic control unit, and adapted to allow the pilot to modify the rate of the second fuel directed to the plurality of cylinders.

4. The aircraft of claim 1, wherein the one or more sensors comprise a sensor selected from the group consisting of a manifold pressure sensor, a crankshaft position sensor, an intake air temperature sensor, and a throttle body position sensor.

5. The aircraft of claim 1, wherein the second fuel delivery system requires electrical power to direct fuel to the plurality of cylinders.

6. The aircraft of claim 1, wherein the second fuel tank is mounted to a belly of the aircraft.

7. The aircraft of claim 1, wherein the second fuel tank is detachable.

8. The aircraft of claim 1, wherein the second fuel delivery system comprises a pressure regulator, the pressure regulator adapted to regulate a pressure of the second fuel.

9. The aircraft of claim 8, wherein:
   the aircraft further comprises engine oil; and
   the engine oil is circulated through the pressure regulator.

10. The aircraft of claim 1, wherein the second fuel comprises natural gas.

11. The aircraft of claim 10, wherein the natural gas comprises compressed natural gas.

12. The aircraft of claim 1, wherein:
    the throttle body comprises a throttle valve; and
    the condition of the throttle body is a position of the throttle valve.

13. The aircraft of claim 1, wherein the condition of the throttle body is a pressure in the throttle body.

14. The aircraft of claim 1, wherein:
    the aircraft further comprises:
      a first set of spark plugs;
      a second set of spark plugs;
      a magneto-based ignition system, the magneto-based ignition system connected to the first set of spark plugs; and
      an electronic ignition system, the electronic ignition system connected to the second set of spark plugs; and
    each of the plurality of cylinders includes a respective first spark plug and a respective second spark plug.

15. The aircraft of claim 14, wherein the magneto-based ignition system is operative without receiving electrical power.

16. The aircraft of claim 1, wherein the second fuel delivery system is operative to pulsedly direct the second fuel from the second fuel tank to the plurality of cylinders.

* * * * *